(12) United States Patent
Lee

(10) Patent No.: US 9,964,273 B2
(45) Date of Patent: May 8, 2018

(54) SHIELD APPARATUS OF HEAD LAMP FOR VEHICLE

(71) Applicant: Hyundai Mobis Co., Ltd., Seoul (KR)

(72) Inventor: Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days. days.

(21) Appl. No.: 15/379,914

(22) Filed: Dec. 15, 2016

(65) Prior Publication Data
US 2017/0175966 A1 Jun. 22, 2017

(30) Foreign Application Priority Data
Dec. 16, 2015 (KR) .......................... 10-2015-0180294

(51) Int. Cl.
*B60Q 1/04* (2006.01)
*F21S 8/10* (2006.01)

(52) U.S. Cl.
CPC .............. *F21S 48/142* (2013.01); *B60Q 1/04* (2013.01); *F21S 48/1784* (2013.01); *F21S 48/1794* (2013.01)

(58) Field of Classification Search
CPC .. F21S 48/142; F21S 48/1784; F21S 48/1794; B60Q 1/04
See application file for complete search history.

(56) References Cited

U.S. PATENT DOCUMENTS

| 7,926,992 B2* | 4/2011 | Kim | .................... F21S 48/1794 362/283 |
| 9,434,295 B2* | 9/2016 | Shin | ........................ B60Q 1/04 |

* cited by examiner

*Primary Examiner* — Tracie Y Green
(74) *Attorney, Agent, or Firm* — H.C. Park & Associates, PLC

(57) ABSTRACT

The present invention provides a shield apparatus of a head lamp for a vehicle. The shield apparatus of the head lamp for a vehicle includes: a case; a cover coupled to the case; a shield supported inside the case and configured to adjust a predetermined light beam pattern generated by a head lamp; a motor configured to drive the shield; a block disposed inside the case and the cover, and configured to rotatably support the shield and limit an angle of rotation of the shield.

11 Claims, 7 Drawing Sheets

SHIELD APPARATUS OF HEAD LAMP FOR VEHICLE

CROSS-REFERENCE TO RELATED APPLICATION

This application claims priority from and the benefit of Korean Patent Application No. 10-2015-0180294, filed on Dec. 16, 2015, which is hereby incorporated by reference for all purposes as if set forth herein.

BACKGROUND

Field

The invention relates generally to a shield apparatus of a head lamp for a vehicle, and, more particularly, to a shield apparatus that can change the light beam pattern generated from the head lamp of the vehicle.

Discussion of the Background

Lamps for a vehicle are generally divided into head lamps installed at the front is side of a vehicle and tail lamps installed at the rear side of the vehicle. The head lamps are mounted onto both front sides of the vehicle to provide a driver a clear view in a driving direction at night.

Recently, head lamps have been configured to move in upward-downward or left-right directions in accordance with the driving environment.

In such head lamps for a vehicle, the light beam pattern can be changed by fully or partially blocking light emitting from the head lamps. For example, a low beam and a high beam for a vehicle head lamp can be implemented.

To change the light beam pattern, a shield is provided in the head lamp. This shield driven by rotation of gears which receive power of a motor is provided inside the head lamp.

However, in a typical head lamp, a stopper is installed to restrict an angle of rotation of a shield, but the shield collides with the stopper and thus generates a great impact sound during the operation of the shield. Also, when a separate component is installed to reduce the impact sound, the manufacturing cost rises and the assembling process becomes complicated. In addition, the separate component has not sufficiently reduced the impact sound.

The above information disclosed in this Background section is only for enhancement of understanding of the background of the invention and, therefore, it may contain information that does not constitute prior art.

SUMMARY

Exemplary implementations of the invention avoid one or more of the foregoing drawbacks and disadvantages by providing a shield apparatus of a head lamp for a vehicle, which has a simple structure and can easily restrict an angle of rotation of a shield.

Exemplary implementations of the invention also provide a shield apparatus of a head lamp for a vehicle that can simplify the assembling process.

Exemplary implementations of the invention also provide a shield apparatus of a head lamp for a vehicle that can reduce an impact sound generated when the shield operates.

The objectives and advantages of the invention are not limited to the above-mentioned objectives and advantages, and other objectives and advantages that are not mentioned will be clearly understood by persons skilled in the art from the following description.

According to one aspect of the invention, a shield apparatus of a head lamp for a vehicle includes: a case; a cover coupled to the case; a shield supported inside the case and configured to adjust a predetermined light beam pattern generated by a head lamp; a motor configured to drive the shield; a block disposed inside the case and the cover, and configured to rotatably support the shield and limit an angle of rotation of the shield.

In an exemplary embodiment, the shield may include a shaft rod at one side thereof, and the block may include a through hole formed therein and be configured to allow the shaft rod to be rotatably inserted therein.

In an exemplary embodiment, the shaft rod of the shield may include a detent, and is the block may include a guide slit and configured to allow the detent to be inserted therein and to be rotated up to a first predetermined angle while being guided by the guide slit. The detent includes a protrusion which is integrally formed with the shaft rod.

In an exemplary embodiment, the block may include a body part comprising the through hole and the guide slit formed therein, and an extending part outwardly extending from the body part and allowing the block to be fixed to the case.

In an exemplary embodiment, the extending part may include a first extension part having a first surface in contact with the case, and a second extension part having a second surface in contact with the cover.

In an exemplary embodiment, the first and second extension parts may be spaced apart from each other by a second predetermined angle.

In an exemplary embodiment, the first and second extension parts may be spaced apart from each other by the second predetermined angle of about 90 degrees.

In an exemplary embodiment, the guide slit may be formed between the first and second extension parts.

In an exemplary embodiment, the body part may include a cutoff part formed at one side thereof, and the cutoff part may guide the detent to the guide slit.

In an exemplary embodiment, the cutoff part may comprise a guide surface, an outer side surface of which inclines such that the depth thereof gradually decreases toward the is guide slit.

In an exemplary embodiment, the guide slit may extend in a longitudinal direction orthogonally crossing the through hole.

Other aspects and exemplary embodiments of the invention are discussed infra.

It is to be understood that both the foregoing general description and the following detailed description are exemplary and explanatory and are intended to provide further explanation of the invention as claimed.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
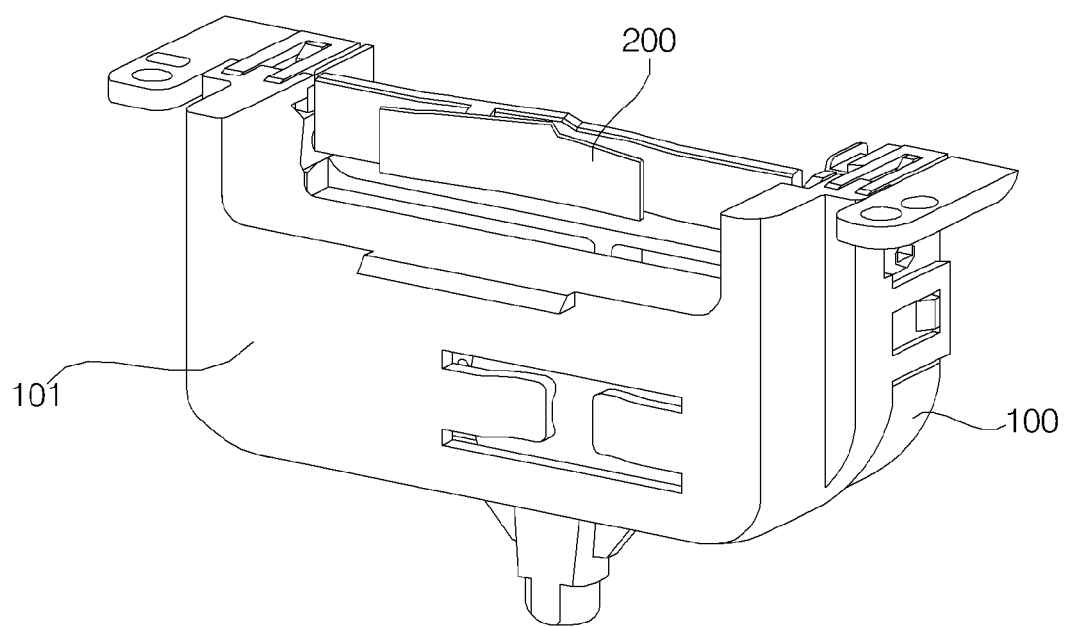
FIG. 1 is a perspective view illustrating a shield apparatus of a head lamp for a vehicle according to an exemplary embodiment of the invention.

It should be understood that the accompanying drawings are not necessarily to scale, presenting a somewhat simplified representation of various exemplary features illustrative of the basic principles of the invention. The specific design features of the invention as disclosed herein, including, for example, specific dimensions, orientations, locations, and shapes will be determined in part by the particular intended application and use environment.

In the figures, reference numbers refer to the same or equivalent parts of the invention throughout the several figures of the drawing.

DETAILED DESCRIPTION OF THE ILLUSTRATED EMBODIMENTS

Hereinafter reference will now be made in detail to various exemplary embodiments of the invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, a shield apparatus of a head lamp for a vehicle according to an exemplary embodiment of the invention will be described with reference to the accompanying drawings.

Figure 2:
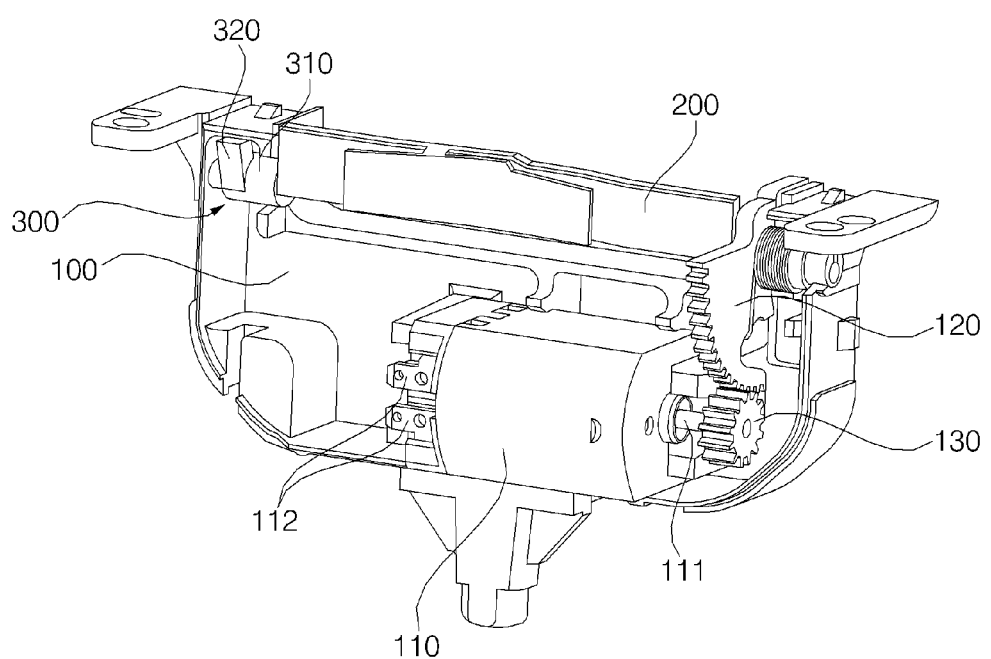
FIG. 2 is a perspective view illustrating the inside of a shield apparatus of a head lamp for a vehicle according to an exemplary embodiment of the invention.
Figure 3:
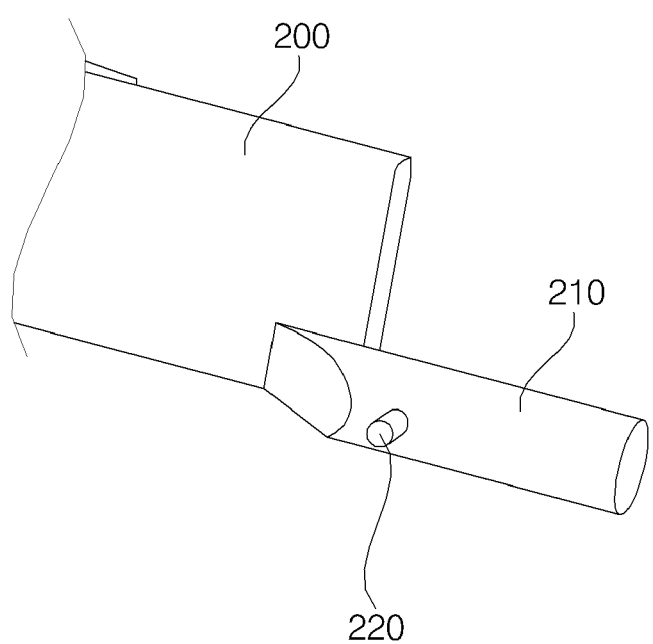
FIG. 3 is an enlarged, perspective view illustrating a portion of a shield according to an exemplary embodiment of the invention.
Figure 4A:
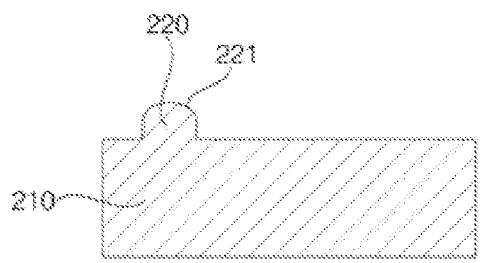
FIG. 4(A) is a cross-sectional view illustrating a detent formed on a shaft rod of a shield according to an exemplary embodiment of the invention.
Figure 4B:
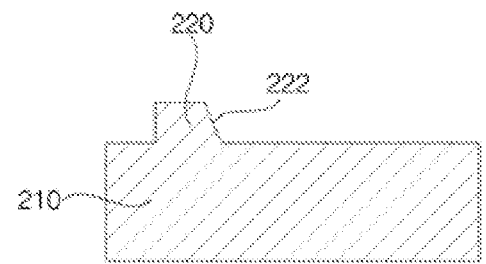
FIG. 4(B) is a cross-sectional view illustrating a detent formed on a shaft rod of a shield according to another exemplary embodiment of the invention.
Figure 5:
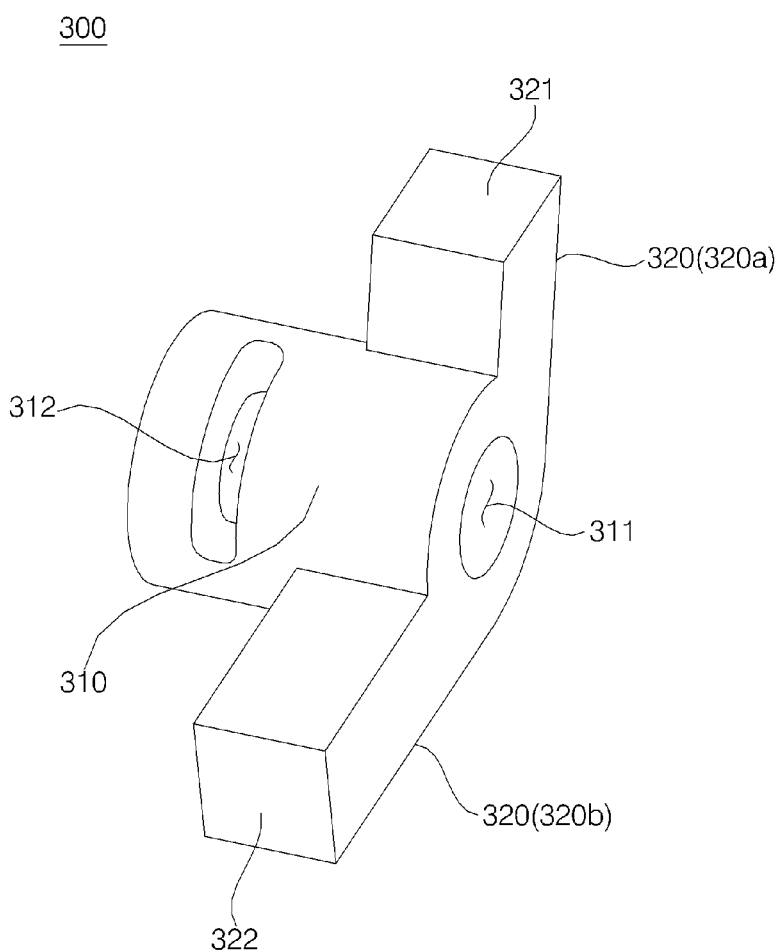
FIG. 5 is a perspective view illustrating a block according an exemplary embodiment of the invention.
Figure 6:
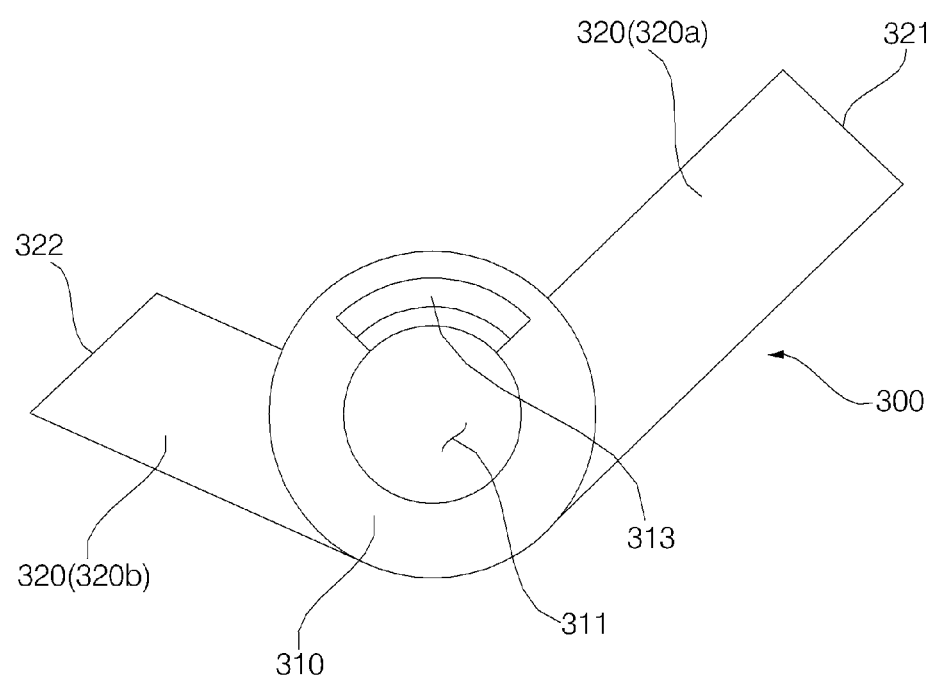
FIG. 6 is a front view illustrating a block according to an exemplary embodiment of the present invention.
Figure 7A:
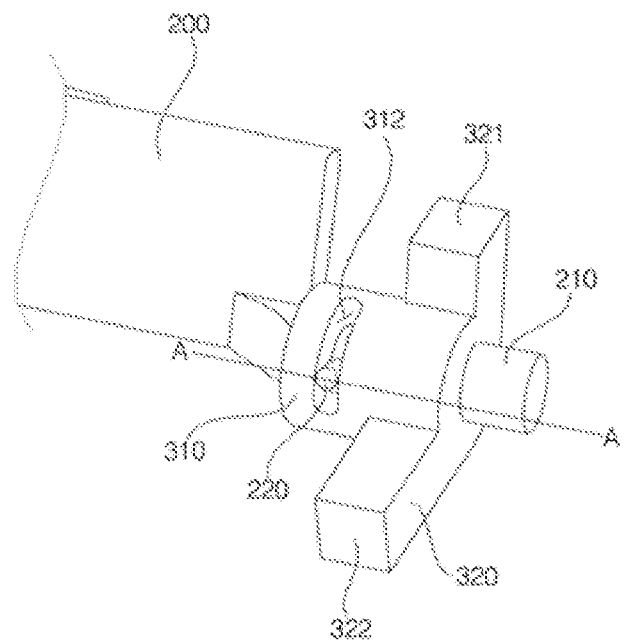
FIG. 7(A) is a perspective view illustrating coupling of a shield and a block according to an exemplary embodiment of the invention.
Figure 7B:
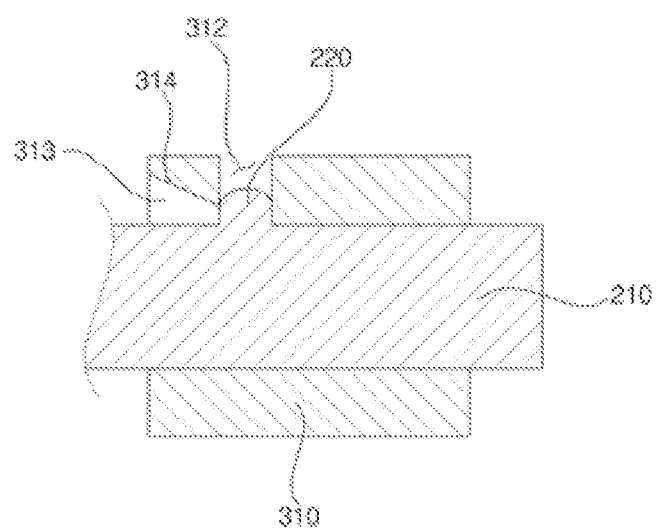
FIG. 7(B) is a cross-sectional view taken along line A-A of FIG. 7(A).

A shield apparatus of a head lamp for a vehicle according to an embodiment of the invention can be modified by those skilled in the art. FIG. 1 is a perspective view illustrating a shield apparatus of a head lamp for a vehicle according to an exemplary embodiment of the invention. FIG. 2 is a perspective view illustrating the inside of a shield apparatus of a head lamp for a vehicle according to an exemplary embodiment of the invention. FIG. 3 is an enlarged, perspective view illustrating a portion of a shield according to an exemplary embodiment of the invention. FIG. 4(A) is a cross-sectional view illustrating a detent formed on a shaft rod of a shield according to an exemplary embodiment of the invention. FIG. 4(B) is a cross-sectional view illustrating a detent formed on a shaft rod of a shield according to another exemplary embodiment of the invention. FIG. 5 is a perspective view illustrating a block according an exemplary embodiment of the invention. FIG. 6 is a front view illustrating a block according to an exemplary embodiment of the invention. FIG. 7(A) is a perspective view illustrating coupling of a shield and a block according to an exemplary embodiment of the invention. FIG. 7(B) is a cross-sectional view taken along line A-A of FIG. 7(A).

Referring to FIGS. 1 to 7, a shield apparatus of a head lamp for a vehicle according to an embodiment of the invention may include a case 100, a cover 101, a shield 200, a motor 110, and a block 300. The cover 101 may be coupled to the case 100. The shield 200 may be supported in the case 100 to form or adjust a predetermined light beam pattern generated by a head lamp. The motor 110 may drive the shield 200. The block 300 may be disposed inside is the cover 101 and configured to rotatably support the shield 200, and may limit the angle of rotation of the shield 200.

The case 100 may be coupled to the cover 101, and may form a space in which the motor 110, the shield 200, and the block 300 can be accommodated.

The motor 110 may drive the shield 200 to rotate. For this, the motor 110 may be connected to a pinion 130 and a shaft 111. The pinion 130 may engage with a gear 120 disposed in the case 100, and the gear 120 may rotate in a clockwise or counterclockwise direction according to the forward or backward rotation of the motor 110.

The pinion 130 may be disposed at the right side of the motor 110 in FIG. 2. More specifically, the pinion 130 may be connected to the shaft 111 protruding to a right side of the motor 110.

The motor 110, based on FIG. 2, may include a connection region 112 that is formed at a left side surface of the motor 110. The connection region 112 may be arranged so as to connect the motor 110 and the power source, e.g., current source (not shown).

The cover 101 may be coupled to the case 110 so as to be disposed at the front side of the case 110.

The shield 200 may be disposed at an upper portion of the inside of the case 100, and may form a predetermined light beam pattern by receiving power of the motor 110 and rotate. More specifically, one side of the shield 200 may be fixed to the gear 120, and the gear 120 may engage with the pinion 130 of the motor 110 to receive power of the motor 100 and rotate. When the gear 120 rotates in a clockwise or counterclockwise direction, the shield 200 may also rotate in a clockwise or counterclockwise direction.

The shield 200 may form various types of light beam patterns in accordance with the angle of rotation of the shaft 111 connected to the motor 110.

The shield 200 may include a shaft rod 210 having a cylindrical rod shape and formed in a direction opposite to the gear 120, thereby being rotatably connected to the case 100.

Referring to FIG. 3, a detent 220 may be formed on the surface of the shaft rod 210, and may protrude forwardly out of the plane of FIG. 3. The detent comprises a protrusion which is integrally formed with the shaft rod.

Referring to FIGS. 4A and 4B, the detent 220 may have a cylindrical shape, the end portion of which has a curved part 221 of an arc shape like an exemplary embodiment shown in FIG. 4(A). Also, the detent 220 may have an inclined surface 222 at one side surface of the detent 220, the thickness of which gradually decreases toward the end portion of the detent 220 as shown, e.g., in the exemplary embodiment shown in FIG. 4(B).

The block 300 may include a body part 310 and an extending part 320 which includes a first extension part 320*a* and a second extension part 320*b*. The body part 310 may include a long through hole 311 into which the shaft rod 210 of the shield 200 is rotatably inserted, and a long guide slit 312 into which the detent 220 of the shaft rod 210 is inserted and is can rotate up to a first predetermined angle. The first extension part 320*a* and the second extension parts 320*b* may protrude and extend in predetermined directions from the body part 310 so as to be fixedly attached to the block 300.

The first extension part 320*a* may have a first surface 321 formed thereon in contact with the case 100, and the second extension part 320*b* may have a second surface 322 formed thereon in contact with the cover 101. Accordingly, when the block 300 is disposed inside the case 100 and then the case 100 and the cover 101 are coupled, the block 300 may make surface contact with the case 100 and the cover 101, and thus may be fixed.

The first extension part 320*a* and second extension part 320*b* may protrude so as to be spaced apart from each other by the second predetermined angle, e.g., about 90 degrees.

A cutoff part 313 may be formed between one side surface of the body part 310 and the guide slit 312 of the block 300. The outer circumferential surface of the cutoff part 313 may have a guide surface 314 which inclines such that the depth of the cutoff part 313 gradually decreases toward the guide slit 312.

Hereinafter, the actions and effects of a shield apparatus of a head lamp for a vehicle according to an exemplary embodiment of the invention will be described as follows.

When the shield 200 and the block 300 are coupled such that the shaft rod 210 of the shield 200 is inserted into the through hole 311 of the block 300, the detent 220 formed on the shaft rod 210 of the shield 200 may be guided by the cutoff part 313 of the block 300 to be rotatably inserted into the guide slit 312.

In this case, the curved part 221 or the inclined surface 222 formed on the end portion of the detent 220 may make contact with the guide surface 314 of the cutoff part 313, and thus the detent 220 can be easily inserted into the guide slit 312.

The detent 220 may be formed of a slightly elastic material, and thus may be inwardly pressurized while being guided along the guide surface 314. Thereafter, when the detent 220 is inserted into the guide slit 312, the end portion of the detent 220 may slightly protrude in an outward direction of the guide slit 312. Alternatively, a groove (not shown) having such a predetermined depth that the detent 220 can pass may be formed in the cutoff part 313, and thus the detent 220 can be inserted into the guide slit 312.

The guide slit 312 may extend in a longitudinal direction orthogonally crossing the through hole 311, and when the shaft rod 210 of the shield 200 rotates in the through hole 311, the detent 220 may rotate while being guided by the guide slit 312. In this case, since the rotation of the detent 220 is stopped when the detent 220 makes contact with both end portions of the guide slit 312, the angle of rotation of the shield 200 may be limited.

Meanwhile, since the first surface 321 of the first extension part 320*a* of the block 300 has a first surface in contact with the case 100 and the second surface 322 of the second extension part 320*b* has a second surface in contact with the cover 101, the block 300 may be fixed to the case 100 and the cover 101, and thus may be prevented from rotating.

A shield apparatus of a head lamp for a vehicle according to an exemplary embodiment of the invention has the following effects.

Because the shield is rotatably supported by the block and the angle of rotation of the shield is limited, the number of components and the manufacturing cost can be reduced and the assembling process can be simplified.

Also, because the angle of rotation is limited while the shield is being guided along the guide slit formed in the block, the impact sound can be reduced when the light beam pattern changes.

The effects of the invention are not limited to the above; other effects that are not described herein will be clearly understood by the persons skilled in the art from the following claims.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A shield apparatus of a head lamp for a vehicle, comprising:
   a case;
   a cover coupled to the case;
   a shield supported inside the case and configured to adjust a predetermined light beam pattern generated by a head lamp;
   a motor configured to drive the shield;
   a block disposed inside the case and the cover, and configured to rotatably support the shield and limit an angle of rotation of the shield,
   wherein the shield comprises a shaft rod formed at one side thereof,
   wherein the block comprises a through hole formed therein and the block is configured to allow the shaft rod to be rotatably inserted therein,
   wherein the shaft rod of the shield comprises a detent, and
   wherein the block comprises a guide slit and the block is configured to allow the detent to be inserted therein and to be rotated over a first predetermined angle while being guided by the guide slit.

2. The shield apparatus of claim 1, wherein the block comprises a body part including the through hole and the guide slit formed therein, and an extending part outwardly extending from the body part and allowing the block to be fixed to the case.

3. The shield apparatus of claim 2, wherein the extending part comprises a first extension part having a first surface in contact with the case, and a second extension part having a second surface in contact with the cover.

4. The shield apparatus of claim 3, wherein the first and second extension parts are spaced apart from each other by a second predetermined angle.

5. The shield apparatus of claim 4, wherein the second predetermined angle is about 90 degrees.

6. The shield apparatus of claim 4, wherein the guide slit is formed between the first and second extension parts.

7. The shield apparatus of claim 1, wherein the body part comprises a cutoff part formed at one side thereof, and the cutoff part guides the detent to the guide slit.

8. The shield apparatus of claim 7, wherein the cutoff part comprises a guide surface, an outer side surface of which inclines such that the depth thereof gradually decreases toward the guide slit.

9. The shield apparatus of claim 1, wherein the guide slit extends in a longitudinal direction orthogonally crossing the through hole.

10. The shield apparatus of claim 1, wherein the detent comprises a protrusion.

11. The shield apparatus of claim 10, wherein the protrusion is integrally formed with the shaft rod.

\* \* \* \* \*